United States Patent [19]
Levine

[11] Patent Number: 4,600,946
[45] Date of Patent: Jul. 15, 1986

[54] ADAPTIVE DEFECT CORRECTION FOR SOLID-STATE IMAGERS

[75] Inventor: Peter A. Levine, Mercer County, N.J.

[73] Assignee: RCA Corporation, Princeton, N.J.

[21] Appl. No.: 697,131

[22] Filed: Jan. 31, 1985

[51] Int. Cl.$^4$ .............................................. H04N 5/14
[52] U.S. Cl. ..................................... 358/163; 358/213
[58] Field of Search ............... 358/213, 212, 163, 167, 358/336

[56] References Cited

U.S. PATENT DOCUMENTS

| | | | |
|---|---|---|---|
| 3,904,818 | 9/1975 | Kovac | 178/7.1 |
| 4,443,817 | 4/1984 | Faroudja | 358/167 |
| 4,481,539 | 11/1984 | Meise et al. | 358/213 |
| 4,488,178 | 12/1984 | Koslov et al. | 358/163 |

FOREIGN PATENT DOCUMENTS 2035745A  6/1980  United Kingdom .

*Primary Examiner*—Gene Z. Rubinson
*Assistant Examiner*—Stephen Brinich
*Attorney, Agent, or Firm*—Eugene M. Whitacre; Peter M. Emanuel; Lawrence C. Edelman

[57] ABSTRACT

In a television camera for developing an output video signal and including a solid-state imager having low contrast single pixel defects, an adaptive defect corrector provides a defect corrected video signal which may contribute to the output video signal. The defect corrector is adaptive in that the contribution of the defect corrected video signal to the output video signal is dependent upon a control signal which changes according to the amount of light reaching the solid-state imager.

11 Claims, 4 Drawing Figures

ADAPTIVE DEFECT CORRECTION FOR SOLID-STATE IMAGERS

FIELD OF THE INVENTION

The present invention relates generally to defect correction apparatus and in particular to an adaptive defect corrector which allows the use of defective solid-state imagers in a television camera.

BACKGROUND OF THE INVENTION

The present CCD (charge coupled device) imager fabrication technology is such that large area CCD arrays suitable for use in broadcast quality television cameras suffer from a very low yield. The low yield is a direct result of imperfections and defects in the manufactured CCD semiconductor chip, which yield in some cases may decrease at a rate related to the fourth power of the area of the chip. This results in a relatively high cost and reduced availability of CCD imagers suitable for high quality television cameras. These defects may manifest themselves as single picture element (pixel) white or black spots of various amplitude in the reproduced image.

The use of defect correction apparatus in conjunction with solid-state imagers having such defects is highly advantageous, in that a greater number of solid-state imagers may become usable, thereby improving the yield of usable imagers and lowering their cost. It is well known that a single pixel defect may be removed from the video signal representative of an image by substitution of picture information from surrounding pixels. For example, U.S. Pat. No. 3,904,818 issued Sept. 9, 1975 in the name of Kovac and assigned like the present application to RCA Corporation shows a system which detects when a photosensor provides excessive dark current and, in response, substitutes a replacement signal that is the average of signals provided by photosensors surrounding the defective one.

In some applications, such as imagers intended for use in broadcast television cameras, signal averaging type defect correctors may not be considered acceptable, since signal averaging, by its nature, introduces artifacts into the television picture. For example, when the camera is viewing a scene having fine detail in the area where the pixel defect is located, the defect corrected signal most probably will not accurately represent the lost picture detail due to the signal averaging.

U.S. Pat. No. 4,481,539 issued Nov. 6, 1984 in the name of Meise et al. and assigned like the present application to RCA Corporation, discloses a defect correction arrangement which does not use signal averaging techniques and instead simultaneously processes corresponding signals derived from two imagers registered to view the same image. The signals provided from the imagers are combined except when one is providing a signal from a defective pixel. In that case, only the signal from the good pixel is used. Although this technique does not generate the aforenoted undesirable signal averaging artifacts, the use of two imagers is required which necessarily increases the cost and size of the defect correction apparatus. Consequently, it is desirable to provide defect correction apparatus which does not require a second imager, i.e., one which develops a replacement signal for a defective pixel by substitution of a signal derived from at least one nearby good pixel.

It has been recognized by the present inventor that many of the imagers rejected during manufacture due to defective pixels in fact contain mostly low contrast single pixel defects. Low contrast defects are those which are not visible in a displayed image under normal lighting conditions due to their relatively low amplitude and only become objectionably noticeable during low light level or high temperature operating conditions. If these imagers were usable for broadcast quality imaging, the yield of usable broadcast quality imagers could be significantly increased, thereby reducing the cost per imager.

SUMMARY OF THE INVENTION

In accordance with the principles of the present invention, an adaptive defect corrector is used in conjunction with a solid-state imager having low contrast pixel defects. The defect corrector is adaptive in that the contribution provided by the defect corrector does not begin until the average level of the imager supplied signal is reduced to the point where the low contrast defective pixels are just about to become objectionably noticeable. If the average imager signal level decreases from that point due, for example, to decreased scene illumination, the defect corrector supplies a contribution to the imager supplied signal. In accordance with an aspect of the invention, the contribution from the defect corrector is gradually increased in response to decrease scene illumination until at some average image signal level the signal provided from the defective pixels is completely substituted for by the defect corrector. At such low light levels, the artifacts produced by the defect corrector will most likely not be noticeable due to noise and other image distortions characteristic of imager low light level operation.

DETAILED DESCRIPTION OF THE INVENTION

Figure 1:
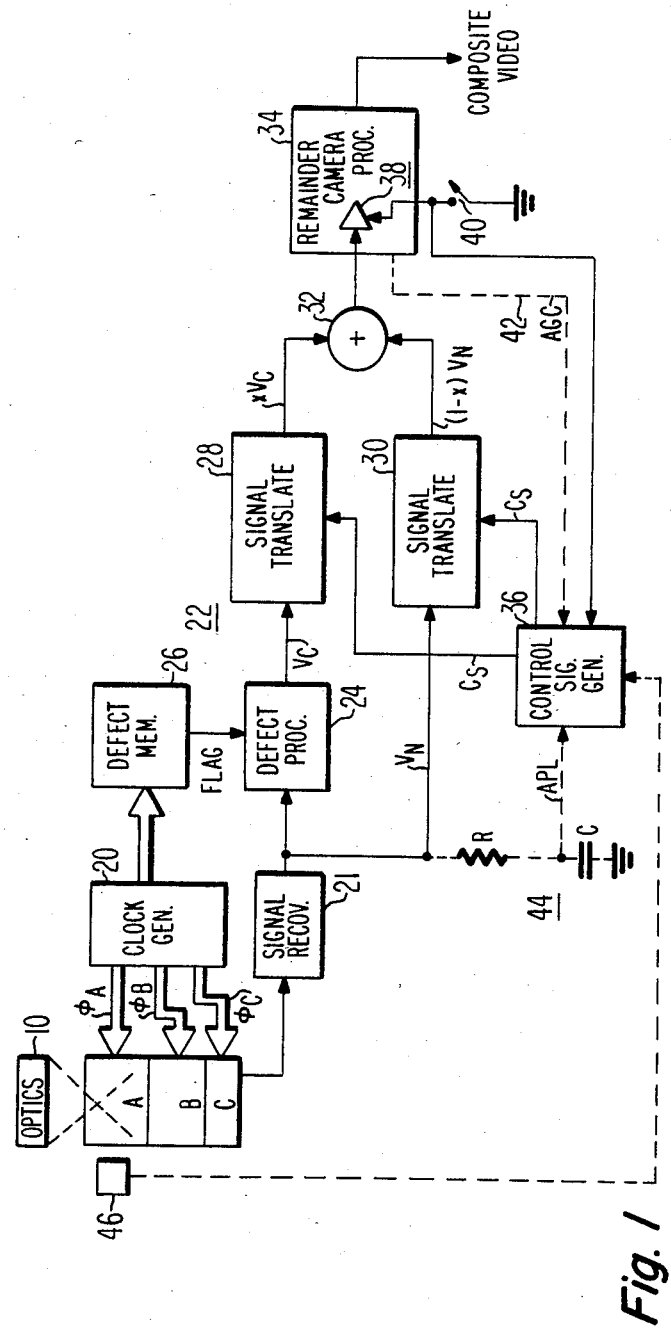
FIG. 1 illustrates partially in block and partially in schematic diagram form, a solid-state imager television camera including an adaptive defect corrector constructed in accordance with the principles of the invention.

In FIG. 1, light reflected or transmitted from a scene (represented by dashed lines) is focused by optics 10 onto the photosensitive imaging portion of a solid-state imager 12. Illustratively, imager 12 is a vertical field-transfer CCD imager such as the SID504 manufactured by and available from RCA Corporation, although other types of solid-state imagers such as MOS devices could also be used. Imager 12 includes an A register 14 responsive to the focused light and a storage B register 16 and a line readout C register 18, the latter of which are both masked from the focused light. Photoelectrons are generated in A register 14 in response to the focused light and accumulate as charge packets descriptive of the scene. The charge packets are constrained to specific locations by electrodes (not shown) arranged in horizontal rows (not shown) and channel stop regions arranged in vertical columns (not shown). B and C registers 16 and 18 are similarly arranged in rows and columns; however C register 18 has only one row. The columns of B and C registers 16 and 18 are aligned with those of A register 14.

Vertical motion of the accumulated charge packets representative of the scene through A and B registers 14 and 16 is controlled by the concurrent application of $\phi_A$ and $\phi_B$ clock signals to A and B registers 14 and 16, respectively, during a transfer interval which occurs during the television vertical retrace period. The $\phi_B$ and $\phi_C$ clock signals are concurrently applied to B and C registers 16 and 18, respectively, during successive horizontal trace periods in the next vertical trace interval for causing line sequential readout of the image representative charge packets in a serial manner from C register 18. The $\phi_A$, $\phi_B$ and $\phi_C$ clock signals are generated by a clock signal generator 20. The operation of a vertical field-transfer CCD imager in response to clock signals supplied from a clock generator is well known to those skilled in the art, rendering further discussion of the image operation unnecessary.

The image representative pixels supplied by C register 18 are processed by a signal recovery circuit 21 for developing a video signal at its output. Signal recovery circuit 21 includes, for example, known noise reduction and pre-amplifier circuitry employing, for example, correlated double sampling, for developing the video signal. Details of circuitry for performing correlated double sampling can be found in a book entitled "Solid-State Imaging", by Jespers Van de Wielf and White published by Noordhoff-Leyden in 1976. Optics 10 includes a conventional iris (light controlling diaphram) not shown, which maintains the incident light on imager 12 within an optimum range which results in a substantially constant peak white level for the video signal provided at the output of signal recovery circuit 21.

At the output of signal recovery circuit 21, the video signal is split into two signal processing paths. One path includes a defect corrector 22 for developing a defect corrected video signal $V_C$ wherein a replacement is provided for each low contrast pixel defect. The other path has no defect correction and provides a nondefect corrected video signal $V_N$. Defect corrector 22 includes a defect processor 24 which processes pixels surrounding the defective pixel for generating the corrected video signal and may use one of the many well known video drop out compensator techniques such as employed in tape playback systems as described e.g., in U.S. Pat. No. 4,122,489 issued Oct. 24, 1978 in the name of Bolger, et al. and assigned like the present application to RCA Corporation. A FLAG signal which is used to enable defect processor 24 is derived from a defect memory 26. Defect memory 26 may comprise a ROM loaded with addresses which are representative of the locations of the low contrast pixels within imager 12, and is described in greater detail in FIG. 3. Clock signals from clock generator 20 are provided to defect memory 26 in synchronism with the clock signals provided to imager 12 so that the FLAG signal is generated in synchronism with the arrival of video signal from a defective pixel at the input of defect processor 24.

The corrected $V_C$ and noncorrected $V_N$ video signals are applied to signal translation stages 28 and 30, respectively, which apply a complementary weighting coefficient to the $V_C$ and $V_N$ video signals respectively applied to their inputs. Thus, the output of stage 28 can be represented as $xV_C$ and the output of stage 30 can be represented by $(1-x)V_N$, wherein x has a value which can vary between 0 and +1.

The respective outputs of stages 28 and 30 are combined by an adder 32 for providing an adaptively defect corrected video signal to the remainder of the camera signal processing circuitry 34 for generating a composite video signal at its output. As is conventional, camera processing circuitry 34 may include gain control circuitry, correction circuitry such as shading, flare and gamma correction, clipping circuitry for the white and black levels, circuitry for the insertion of blanking and sychronizing signals, an RBG matrix and a chroma modulator.

As previously noted, defect correction in general is not desirable in a broadcast quality camera, since it necessarily introduces artifacts into the video signal. However, when an imager having low contrast pixel defects is used in a television camera, during normal scene illumination, the defects will not be noticeable. During normal illumination, enough light is focused onto the CCD to result in full wells of image representative charge signals corresponding to white areas of the scene. For example, a full well of charge may correspond to 100,000 electrons, while a low contrast pixel (resulting from, for example, 5,000 electrons of excessive dark current) will correspond to 105,000 electrons. Since television cameras include gamma correction circuitry which compresses the white levels of the video signal by a factor of approximately four, the low contrast defect will not be noticeable. Furthermore, if the low contrast defective pixel is located in a dark area of an otherwise well lit scene, the low contrast defect will still not be noticeable since a 5,000 electron dark current signal will still appear dark. However, if the overall or average scene illumination is decreased to the point wherein it cannot be compensated for by the iris (not shown) in optics 10. Consequently, the gain of amplifiers in the video signal processing path is increased, resulting in amplification of the video signal including the low contrast defects to the point where the defects may become objectionable noticeable. Consequently, in accordance with the present invention, the defect corrected video signal $V_C$ is not used for forming the video signal supplied to the remainder of camera processing circuitry 34 until the video signal supplied from the imager has an average level which has been reduced to a predetermined point wherein low contrast pixel defects will become objectionably noticeable.

Specifically, in this regard, a control signal generator 36 provides a control signal $C_S$ to each of stages 28 and 30 for controlling the amount of weighting provided to their respective input signals, i.e., it controls the value of the coefficient x. When $C_S$ causes x to be equal to 0, none of the corrected video signal $V_C$ is applied to adder 32 and only the noncorrected video signal $V_N$ is processed by the remainder of the camera processing circuitry 34. When $C_S$ causes x to be equal to 1, none of the noncorrected but all of the corrected video signal is applied to adder 32.

In its most rudimentary configuration, control signal generator 36 is responsive to a high gain condition of a controllable video signal amplifier 38 illustratively included within camera processing circuitry 34 for generating the $C_S$ control signals. During low light level conditions, the camera operator closes a switch 40 which causes amplifier 38 to be operated in the high gain condition. Control signal generator 36 is responsive to switch 40 for generating $C_S$ control signals which cause x to be equal to 1 when switch 40 is closed and equal to 0 when switch 40 is open. Therefore, when amplifier 38 is operated in the high gain mode, switch 40 is closed and control signal generator 36 causes signal translating stages 28 and 30 to operate such that only the defect corrected video signal $V_C$ is applied to adder 32. Conversely, when amplifier 38 is operated in the low gain mode, representative of normal scene illumination, switch 40 is open and control signal generator 36 causes signal translating stages 28 and 30 to operate such that only the nondefect corrected video signal $V_N$ is applied to adder 32. In this embodiment, signal translating stages 28 and 30 may simply comprise on/off transmission gates and control signal generator 36 a voltage level shifter for generating the proper control signals $C_S$ for controlling the transmission of gates 28 and 30 in response to the position of switch 40.

Figure 2B:
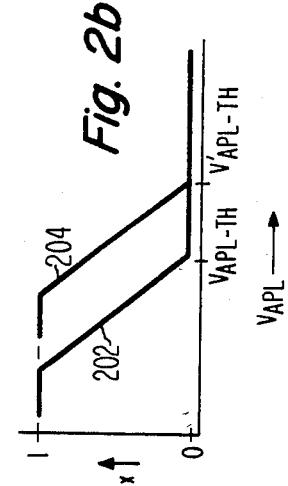
FIGS. 2a and 2b are graphs useful for understanding the operation of the adaptive defect corrector of FIG. 1.
Figure 2A:
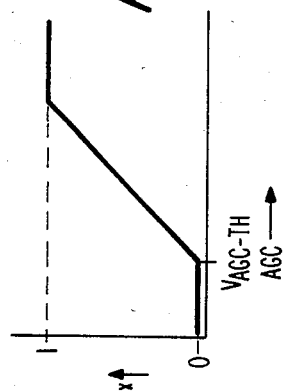

It may be desirable to "fade-in" the defect corrected video signal with the nondefect corrected video signal in accordance with the reduction of light focused on the imager. Furthermore, some television cameras may not include an amplifier gain control switch 40. Thus, in an alternative embodiment, an AGC signal shown by dashed line 42 which is used for automatically controlling the gain of a video signal processing amplifier, such as amplifier 38 in camera processor 34, is applied to control signal generator 36. In response thereto, control signal generator 36 and stages 28 and 30 change the weighting factor x as indicated by the graph of FIG. 2a. Consequently, as the AGC signal increases past a threshold level indicated as $V_{AGC-TH}$ in FIG. 2a, indicating that the overall scene light level is reduced to the point wherein low contrast defects are about to just become objectionably noticeable, the value of x is increased from 0 toward 1. This gradually increases the percentage of defect corrected video signal $V_C$ used and correspondingly decreases the percentage of nondefect corrected video signal $V_N$, for developing the composite video signal. In this alternative embodiment, stages 28 and 30 comprise conventional signal multipliers and control generator 36 is responsive to the AGC signal for generating and supplying a control signal corresponding to the curve illustrated in FIG. 2a for application to stage 28 and for generating and applying a complementary type control signal corresponding to $1-x$ to stage 30.

Instead of sensing the AGC signal as an indication of low scene illumination, in some applications it may be desirable to sense the average picture level (APL). When the APL is below a predetermined threshold level indicated as $V_{APL-TH}$ illustrated in FIG. 2b, it can be assumed that the picture is relatively dark due to low scene illumination. As previously noted, it is only under low scene illumination that low contrast pixel defects become objectionably noticeable. Accordingly, an APL detector 44 including an RC integrator circuit responsive to the video signal at the output of signal recovery circuit 21 may be provided for applying an APL signal to control signal generator 36 as illustrated by dashed lines. In response to the APL signal, control signal generator 36 and stages 28 and 30 cooperate to change the weighting factor x as indicated by the graph of FIG. 2b. As indicated by curve 202, before the APL signal has decreased to the threshold level, x is equal to 0 and the defect corrector output is not used. However, as the APL decreases past the threshold level, x is correspondingly increased towards 1, thereby increasing the proportionate use of the defect corrected signal and correspondingly decreasing the use of the nondefect corrected signal.

Since, as well known, dark current increases with increases in the temperature in the imager, the severity of the low contrast pixel defects also increases with increases in imager temperature. In accordance with a further aspect of the invention, a temperature responsive signal $C_T$ is also provided to control signal generator 36 (as illustrated by dashed lines) for increasing the APL threshold level in response to imager temperatures which are elevated from the normal operating temperature. Thus, when the imager is operated under elevated temperature conditions, the weighting coefficient curve 202 is shifted to the right, as indicated by curve 204 of FIG. 2b, so that proportionate use of the defect corrector output signal begins when the APL is reduced from $V'_{APL-TH}$. At some elevated temperature, the APL theshold voltage may even be increased to the point wherein the defect corrector output will be used under even normal scene illumination. This condition is consistent with the principles of the invention since under elevated temperature conditions, even low contrast pixel defects can be objectionably noticeable with even normal scene illumination.

The temperature responsive signal $V_T$ can be provided by a diode 46 which is integral or otherwise thermally associated with imager 12 and which is operated in a forward biased condition by an applied fixed current (not shown). As well known, the voltage provided across a forward biased diode P-N junction decreases with increases in temperature and can therefore be used to determine changes in imager temperature.

Figure 3:
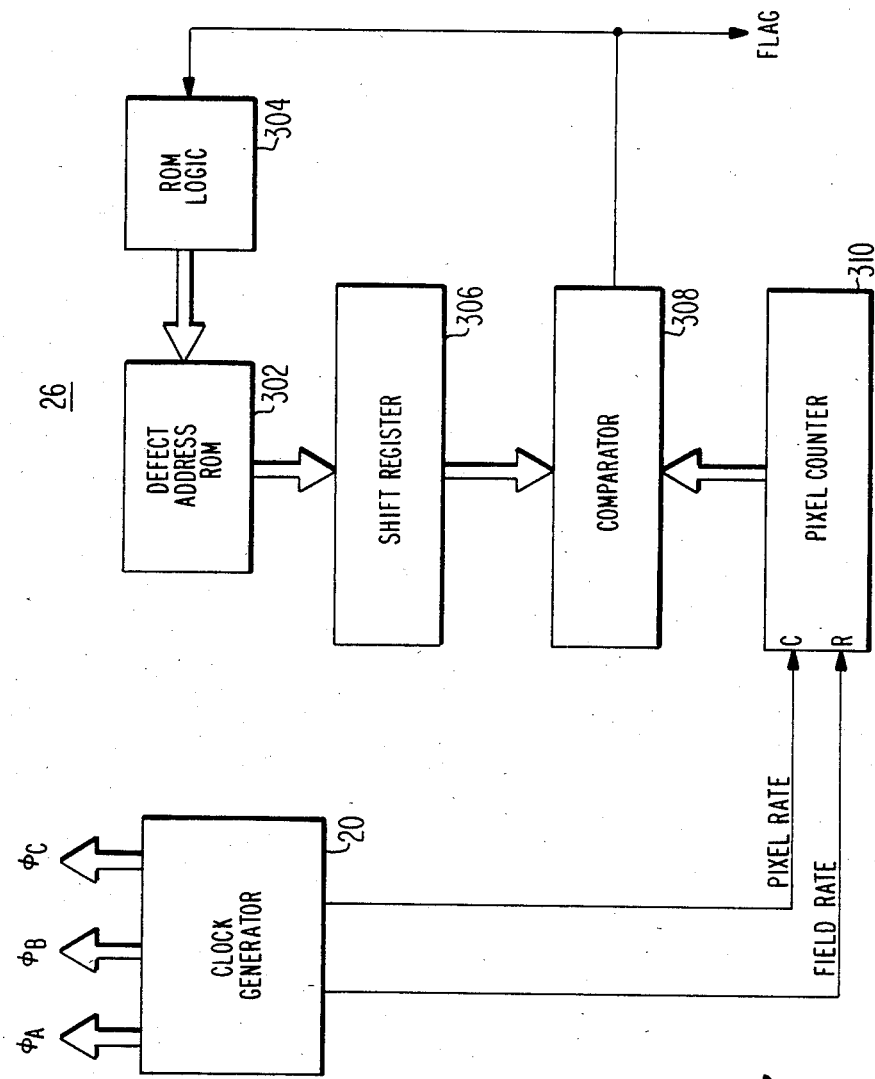
FIG. 3 is a block diagram of a defect memory suitable for use in the adaptive defect correction of FIG. 1.

FIG. 3 illustrates in block diagram form details of defect memory 26 of FIG. 1. A defect address read only memory (ROM) 32 has stored therein during camera manufacture addresses corresponding to the location of each low contrast defective photosensor within the field of photosensors included within imager 12. A ROM logic circuit 304 indicates to the address ROM 302 when to supply the address of the next to be encountered defective photosensor read from imager 12. ROM logic 304 includes initialization circuitry for causing ROM 302 to provide at its output the address of the first defective photosensor, which address is stored in a shift register 306 and applied as one input to a comparator 308. A pixel counter 310 is responsive to pixel rate signals supplied from clock generator 20 to its clock (C) input for supplying to the other input of comparator 308 address signals corresponding to the photosensor location presently being supplied from imager 12. When the address signals applied to comparator 308 match, a FLAG signal is generated at its output, which enables defect processor 24 of FIG. 1. ROM logic 304 senses the FLAG for changing the signals it supplies to ROM 302, in order to indicate to ROM 302 that the address of the next defective pixel should be outputted. A field rate signal supplied from clock generator 20 is applied to a reset (R) input of pixel counter 310 for resetting counter 310 after a complete field of photosensors has been read out from imager 12.

Although the invention has been described for use within a television camera having a single solid-state imager, it should be clear that in multiple imager cameras an adaptive defect corrector of the type described herein could be associated with each of the imagers. Furthermore, although gain controlled amplifier 38 is illustrated as being included in camera processor 34, it could just as well have been provided in signal recovery circuit 21. In this case, however, APL detector 44 should be coupled to signal recovery circuit 21 at a point before the gain controlled amplifier.

What is claimed is:

1. A television camera comprising:
   optical means for imaging light from a scene;
   a solid-state imager, subject to low contrast defective pixels, for developing a video signal in response to light image by said optical means onto said solid-state imager;
   first and second signal processing means, said first signal processing means including a defect corrector responsive to said imager supplied video signal for developing a defect corrected video signal and a first signal translation stage, and said second signal processing means including a second signal translating stage coupled to be responsive to the signals supplied from said imager for supplying a video signal which is not defect corrected, the amount of signal being translated from the input to the output of said first and second signal translating stages being controlled in a complementary manner in response to respective control signals;
   control means for providing said control signals with respective levels which vary according to the amount of light imaged on said imager; and
   combining means for combining signal provided at the output of said first and second signal translating stages for developing an adaptively defect corrected video signal.

2. The apparatus of claim 1, wherein:
   said control means includes a multi-position gain control switch which controls the amount of gain provided to said imager supplied video signal in an effort to maintain it at a constant level, said respective control signals being generated in response to the position of said gain control switch.

3. The apparatus of claim 1, wherein:
   said control means includes means for generating an AGC signal for a gain-controlled amplifier used for maintaining the gain of said imager supplied video signal at a substantially constant level, said respective control signals being generated in response to an AGC signal applied to control the gain of said gain-controlled amplifier.

4. The apparatus of claim 3, wherein:
   said respective control signals generated by said control means causes the amount of signal translation provided by said first and second signal translation stages to vary in a complementary manner, such that when said AGC signal causes the gain of said gain-controlled amplifier to increase, the amount of said defect corrected video signal applied to said combining means is correspondingly increased while the amount of said video signal which is not defect corrected is correspondingly decreased.

5. The apparatus of claim 1, wherein said control means includes;
   an APL detector providing an output signal representative of the average brightness level of the focused image, said respective control signals being generated in response to the level of the output signal of said APL detector.

6. The apparatus of claim 5, wherein:
   said respective control signals generated by said control means causes the amount of signal translation provided by said first and second stages to vary in a complementary manner such that when said APL signal decreases past a predetermined threshold level, the amount of said defect corrected video signal applied to said combining means is correspondingly increased while the amount of said video signal which is not defect corrected is correspondingly decreased.

7. The apparatus of claim 5, wherein:
   said control means generates said respective control signals in response to said APL signal after said APL signal decreases below a predetermined threshold level.

8. The apparatus of claim 7, including:
   temperature sensing means for providing a signal representative of the operating temperature of said imager to said control means, said control means changing said predetermined threshold level in response to said temperature representative signal.

9. A television camera comprising:
   optical means for imaging light from a scene;
   a solid-state imager, subject to low contrast defective pixels, for developing a video signal in response to light image by said optical means onto said solid-state imager;
   first and second signal processing means, said first signal processing means including a defect corrector responsive to said imager supplied video signal for developing a defect corrected video signal $V_c$ and a first signal translation stage, and said second signal processing means including a second signal translating stage coupled to be responsive to the signals supplied from said imager for supplying a video signal $V_n$ which is not defect corrected, the amount of signal being translated from the input to the output of said first and second signal translating stages being continuously adjustable in a complementary fashion; and
   combining means for combining signal provided at the output of said first and second signal translating stages for developing an adaptively defect corrected video signal.

10. The apparatus of claim 9, further including:
    control means for providing said control signal with a level which according to the amount of light imaged on said imager.

11. The apparatus of claim 9, wherein:
    the amount of signal being translated from the input to the output of said first and second signal translating stages being represented by $xV_c$ and $(1-x)V_n$, respectively, where x can assume any value between 0 to 1 in response to a control signal.

* * * * *